US011138205B1

United States Patent
Mohajer et al.

(10) Patent No.: US 11,138,205 B1
(45) Date of Patent: Oct. 5, 2021

(54) FRAMEWORK FOR IDENTIFYING DISTINCT QUESTIONS IN A COMPOSITE NATURAL LANGUAGE QUERY

(71) Applicant: SoundHound, Inc., Santa Clara, CA (US)

(72) Inventors: Keyvan Mohajer, Los Gatos, CA (US); Bernard Mont-Reynaud, Sunnyvale, CA (US); Philipp Hubert, Toronto (CA)

(73) Assignee: Soundhound, Inc., Santa Clara, CA (US)

( * ) Notice: Subject to any disclaimer, the term of this patent is extended or adjusted under 35 U.S.C. 154(b) by 268 days.

(21) Appl. No.: 16/292,190

(22) Filed: Mar. 4, 2019

Related U.S. Application Data

(63) Continuation of application No. 14/622,098, filed on Feb. 13, 2015, now abandoned.

(60) Provisional application No. 62/095,693, filed on Dec. 22, 2014.

(51) Int. Cl.
| | |
|---|---|
| *G06F 16/00* | (2019.01) |
| *G06F 16/2457* | (2019.01) |
| *G06F 16/2455* | (2019.01) |
| *G06F 40/40* | (2020.01) |

(52) U.S. Cl.
CPC ...... *G06F 16/2457* (2019.01); *G06F 16/2455* (2019.01); *G06F 40/40* (2020.01)

(58) Field of Classification Search
CPC .......................... G06F 16/2457; G06F 16/2455
See application file for complete search history.

(56) References Cited

U.S. PATENT DOCUMENTS

| | | | |
|---|---|---|---|
| 5,937,385 | A  | 8/1999  | Zadrozny et al. |
| 6,336,217 | B1 | 1/2002  | D'Anjou et al. |
| 8,190,423 | B2 | 5/2012  | Rehberg et al. |
| 8,566,096 | B2 | 10/2013 | Bangalore et al. |
| 9,672,812 | B1 | 6/2017  | Watanabe et al. |

(Continued)

OTHER PUBLICATIONS

"Powerset (company)" Wikipedia, Last modified Oct. 7, 2015, 5 pages, [Online] [Retrieved on Dec. 12, 2015] Retrieved from the internet<URL: http://en.wikipedia.org/wiki/Powerset%28company%29>.

(Continued)

*Primary Examiner* — Khanh B Pham
(74) *Attorney, Agent, or Firm* — Fenwick & West LLP

(57) ABSTRACT

A query-processing server provides natural language services to applications. More specifically, the query-processing server receives and stores domain knowledge information from application developers, the domain knowledge information comprising a linguistic description of the natural language user queries that application developers wish their applications to support. A first portion of the domain knowledge information is applied to transform a natural language query received from an application to an ordered sequence of question elements. A second portion of the domain knowledge information is applied to group the ordered sequence of question elements into a plurality of distinct structured questions posed by the natural language query. The distinct structured questions may then be provided to the application, which may then execute them and obtain the corresponding data referenced by the questions.

14 Claims, 5 Drawing Sheets

(56) References Cited

U.S. PATENT DOCUMENTS

| | | | |
|---|---|---|---|
| 9,805,018 B1 | 10/2017 | Richfield | |
| 9,916,628 B1* | 3/2018 | Wang | G06Q 40/123 |
| 2002/0010574 A1 | 1/2002 | Tsourikov et al. | |
| 2004/0068713 A1 | 4/2004 | Yannakoyorgos et al. | |
| 2004/0088158 A1 | 5/2004 | Sheu et al. | |
| 2006/0036430 A1 | 2/2006 | Hu | |
| 2007/0136246 A1* | 6/2007 | Stenchikova | G06F 16/951 |
| 2009/0070298 A1 | 3/2009 | Thione et al. | |
| 2011/0320187 A1 | 12/2011 | Motik et al. | |
| 2012/0078611 A1 | 3/2012 | Soltani et al. | |
| 2014/0280246 A1 | 9/2014 | Riggs et al. | |
| 2015/0032443 A1 | 1/2015 | Karov et al. | |
| 2015/0186110 A1 | 7/2015 | Kannan | |
| 2015/0269139 A1* | 9/2015 | McAteer | G06F 16/367 704/9 |
| 2015/0331850 A1 | 11/2015 | Ramish | |
| 2016/0055234 A1* | 2/2016 | Visotski | G06F 16/3329 707/728 |
| 2016/0328467 A1 | 11/2016 | Zou et al. | |

OTHER PUBLICATIONS

Kaplan, R.M. et al., "Constituent Coordination in Lexical-Functional Grammar," '88 Proceedings of the 12'h Conference on Computational Linguistics—vol. 1, 1988, pp. 303-305, [Online] [Retrieved on Dec. 12, 2015] Retrieved from the internet<URL:http://www.aclweb.org/anthology/C88-1061>.

Kaplan, R.M., "Deep Natural Language Processing for Web-scale Search," Abstract, Proceedings of the LFG09, 2009, 1page, [Online] [Retrieved on Dec. 12, 2015] Retrieved from the Internet<URL: http:!/web.stanford.edu/group/cslipublications/cslipublications/LFG/14/abstracts/lfg09abs-kaplan .html>.

United States Office Action, U.S. Appl. No. 14/622,098, dated Aug. 9, 2017, 8 pages.

United States Office Action, U.S. Appl. No. 14/622,098, dated Feb. 7, 2017, 12 pages.

United States Office Action, U.S. Appl. No. 14/622,098, dated Mar. 13, 2018, 10 pages.

United States Office Action, U.S. Appl. No. 14/622,098, dated Sep. 5, 2018, 11 pages.

* cited by examiner

FRAMEWORK FOR IDENTIFYING DISTINCT QUESTIONS IN A COMPOSITE NATURAL LANGUAGE QUERY

CROSS REFERENCE TO RELATED APPLICATION

This application is a continuation of U.S. application Ser. No. 14/622,098, filed on Feb. 13, 2015, which claims the benefit of Provisional Application No. 62/095,693, filed on Dec. 22, 2014, which are hereby incorporated herein by reference.

TECHNICAL FIELD

The disclosed embodiments relate generally to computer-implemented methods for natural language analysis, and more specifically, to identifying each of the potentially many distinct questions possible for a given natural language query.

BACKGROUND

Many computer applications, such as search engines, navigation systems, document management systems, media players, and the like are configured to receive information requests in a natural language format, e.g., as written or spoken queries. However, natural language queries may be arbitrarily complex, and hence difficult for applications to interpret, in comparison with highly structured, highly constrained artificial query formats, such as queries specified in terms of Boolean operators.

For example, an application supporting natural language queries in the geography domain may need to respond, not only to simple user queries with an easily-defined grammatical structure (e.g., "What is the area of Japan?"), but also to more complex queries including those whose grammatical structure includes coordinating conjunctions, such as: "What are the area and the population of Japan and China?", "Area of Japan in square miles and square meters?", "What is the area of Japan and the population of China and Russia and their official language?", and the like. Such natural language queries may be called "composite queries," in the sense that they include several distinct questions (for which corresponding distinct answers may be obtained). While it is easy for humans to identify the distinct questions, current computer systems have very limited capabilities to computationally analyze such queries.

Designing and implementing a computer program to parse and interpret composite queries in a particular domain requires expertise far beyond that of average application developers, and thus is not feasible for most developers. Further, such an endeavor typically requires a great amount of time and effort, even for those (few) developers who are capable of it. The challenge of developing advanced natural language applications that handle composite queries is particularly high when the application is expected to deal with multiple domains simultaneously. A further challenge is to develop "broad spectrum" natural language systems that will understand not only well-formed English sentences (e.g., "What are the area of Japan and the population of China?"), but also terse and ungrammatical utterances (e.g., "Area Japan population China") which resemble (but are not) keyword-based search queries. In order to be useful to a broad range of users, a system should correctly interpret natural language queries of every sort.

SUMMARY

A query-processing server provides natural language services to existing software applications, enabling such applications to receive and process natural language queries. More specifically, the query-processing server receives and stores domain knowledge information from application developers, the domain knowledge information comprising a linguistic description, in a defined computer language format, of the natural language user queries that application developer intend an application to support; this includes constraints on the semantic representations of queries (notably the domain ontology) as well as on procedures that allow computation and reasoning in the domain of interest. The domain knowledge information also includes domain data, stored as internal or external databases of facts with a method to convert a question to an appropriate query format. The domain knowledge is encoded in a defined computer language format that is adapted to be processed by the query-processing server. The query-processing server uses the domain knowledge information to parse and interpret natural language queries received from a user or agent via the application, to produce one or more question elements, where a question element is a computer-coded representation of a semantic component corresponding to a portion of the query portion of a natural language question and conveying a discrete meaning. For example, in the natural language query "What is the area of Japan in square miles?", one element is a computer-coded representation of the object "Japan" (e.g., the structure [class=object, type="Country", value="Japan"]); another element is a computer-coded representation of the attribute "area"; and another element is a computer-coded representation of the qualifier "square miles".

In the case of composite queries, the query-processing server decomposes and groups the various question elements identified in a user query into a set of distinct questions that represent the meaning of the user's query. (The term "question", as used herein, is shorthand for an electronic data structure representing a distinct inquiry posed by the user's natural language query.) The set of questions may then be sent back to the application, which interprets the questions by reading the elements of the question data structure and obtains corresponding data. Unlike the natural language queries from which they were derived, each generated question has a specifically-defined, computer-readable format according to the domain ontology, and is thus straightforward for the application to act upon in order to complete the answer to the query.

In one embodiment, the domain knowledge information for a particular domain includes semantic grammar data and grouping data. The query processing server uses the semantic grammar data to transform a natural language query in its domain to a sequence of question elements that represent the different components of the query (e.g., particular objects, attributes of the objects, or qualifiers of the attributes). The grouping data indicates which of the query components can be combined into a single question in the relevant domain, and the query-processing server uses the grouping data to determine how the various question elements should be combined, forming the set of questions accordingly.

The semantic grammar can be designed to be "broad spectrum," in the sense discussed earlier. Syntax, when present in the semantic grammar, will be used to constrain interpretations. For example, "the Japan of area" and "area's Japan" will both be rejected by the semantic grammar, while "the area of Japan" and "Japan's area" will be accepted. The semantic grammar can additionally support a weaker syntax and accept an informal query such "Japan area", and the informal form will be treated the same (if retained as the most probable interpretation) as the more correct form "Japan's Area".

In the remainder of the discussion, it is understood that the term "question" refers to a computer-coded data structure, and not to a purely natural language statement made by a humans. For example, for the natural language query "What is the area of Japan in square miles and square meters?", one question posed by the query might be represented with a sequence three data structures representing question elements, such as <[class=object, type="Country", value="Japan"], [class=attribute, type="area"], [class=qualifier, type="unit", value="square miles"]>, where (for example):

[class=object, type="Country", value="Japan"]

is a data structure representing the country "Japan." Similarly, other terms used herein, such as "semantic grammar" and "grouping data", also refer to computer-coded data structures, rather than to a purely mental abstraction, and may also include computer-executable instructions implemented as machine code, assembly code, or code in a higher-level programming language (e.g., C++) or scripting language.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
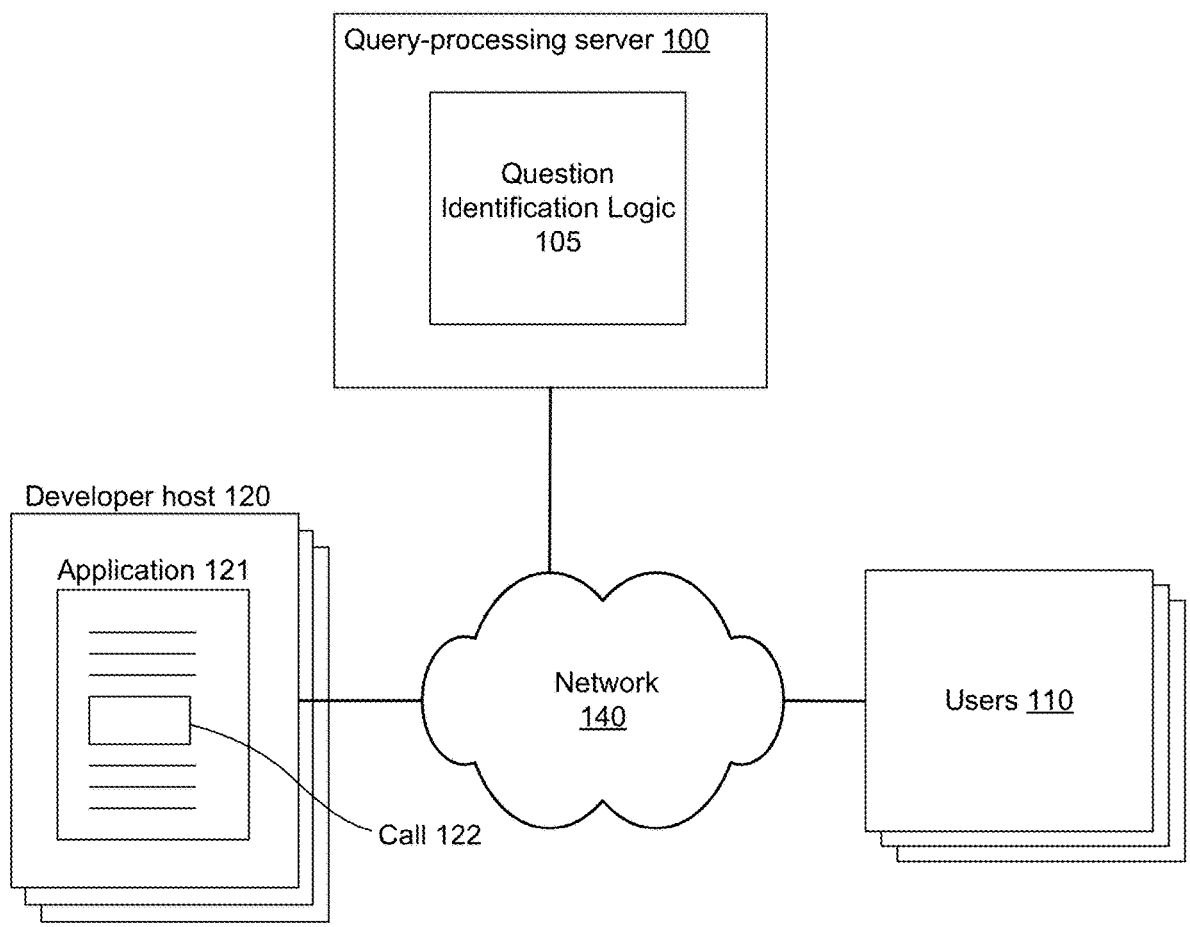
FIG. 1 shows a system environment in which query processing takes place, according to one embodiment.

FIG. 1 shows a system environment in which query processing takes place, according to one embodiment. Users of client devices 110 submit natural language queries to software applications 121 hosted on developer host systems 120. The applications 121 delegate the analysis of the natural language queries to a query-processing server 100 that identifies the distinct questions implied by the natural language query and represents them with a simple, regular structure. The applications 121 can then with relative ease interpret the simple, well-structured questions and obtain the corresponding information represented by the questions.

More specifically, the developer host systems 120 (e.g., web/application servers) provide the runtime environment for applications 121 developed by developers. A host system 120 is a computer system including one or more web servers, application servers, databases, and related computer hardware and software. The developers may administer the developer host systems 120, or the developer hosts may be administered by third parties.

Client devices 110 submit natural language queries from users for information to the applications 121. The various applications 121 can support natural language queries in any domain that the developers intend to support, each domain representing a particular area of information. For example, one developer can provide an application 121 supporting queries in the domain of geography/places, e.g., where the application 121 is configured to process natural language questions about populations and sizes of countries. As another example, another developer can provide an application 121 configured to process natural language queries in the domain of entertainment, e.g., responding to questions about particular movies, music, etc. Of course, a particular application 121 is not limited to a single domain, but rather may support queries in any number of domains. For example, a virtual assistant application may support queries in a large number of distinct domains, such as messaging, calendaring, task scheduling, and communications.

Since the developers of the applications 121 typically lack the considerable expertise required to properly configure an application 121 to process natural language queries, applications 121 are configured to make calls 122 (e.g., web service calls) that, in one embodiment, delegate the analysis of the natural language queries to the query-processing server 100 by passing the text of the natural language queries to the query processing server. The query-processing server 100 includes question identification logic 105—described in more detail below with respect to FIG. 3—that handles the details of the natural language query analysis. The question identification logic 105 maps the natural language query to an output comprising a set of discrete questions encoded in a computer-readable format, using (in part) a computer-implemented grammar. The question identification logic 105 is specially programmed code that is not available in a generic computer system, and implements the algorithms described herein. Each discrete question produced by the query processing server 100 represents the information of one of the questions implied by the natural language query, but represents it with a simple, regular data structure based on the computer-implemented grammar, which can be interpreted by a computer algorithm executed at the application 121, as opposed to the potentially irregular and complex natural grammatical structure of the original natural language query, which cannot directly be processed and executed in its original format. Thus, the query processing server 100 operates to transform the original input of a natural language query including a composite query into an output of a set of discrete, computer-encoded questions.

The applications 121 receive the set of separate questions produced by the question identification logic 105—e.g., by receiving the questions from the query-processing server 100 over a network 140—and interpret and execute each question, providing the results back to the client device 110 by which the natural language query was submitted.

Following the interpretation of a user query, the applications 121 may also easily reconstruct the natural language equivalent of each question (mapping back from an internal data structure to a natural language representation) and include the reconstructed text as part of a user query's result. As a specific example according to one embodiment, if a question contained question elements specifying (in essence) "Object Type='Country' Value='Japan'", "Attribute Value=Area", "Qualifier Type=TimeRange Value="1995", "Qualifier Type='Unit' Value='Square Miles', an application 121 could not only construct and execute a structured query (e.g., SQL) to obtain the result, but could also construct a corresponding natural language fragment to represent the result, such as "Japan's area in 1995 in square miles is:".

As an example of this process, the client device 110 might submit the natural language query "What is the area of Japan in square miles and square meters?" to an application 121. The query-handling code 122 within the application 121 would then submit the natural language query to the question identification logic 105 of the query-processing server 100. The question identification logic 105 would then produce two distinct questions—one representing the question "What is the area of Japan in square miles?", and the other representing the question "What is the area of Japan in square meters?"—since the natural language query is implicitly asking both of these questions.

The query-processing server 100, the developer host system 120, and the systems of the client devices 110 may be implemented with various forms of hardware in different embodiments. Developer host systems 120 and client devices 110 communicate with the query-processing server 100 through a network 140. The network may be any suitable communications network for data transmission. In one embodiment, the network 140 is the Internet and uses standard communications technologies and/or protocols.

Although the question identification logic 105 is illustrated in FIG. 1, and described throughout the below, as being implemented on the query-processing server 100, it is appreciated that the question identification logic can be located elsewhere in other embodiments. For example, in one embodiment the question identification logic 105 is implemented as a runtime library located directly on the developer host systems 120. In all embodiments, the question identification logic 105 is a set of computer implemented algorithms, as further described herein. Finally, as will be apparent from the following discussion, the algorithms and processes described herein require implementation on a computer system, and are not performed by humans using mental steps.

Figure 2:
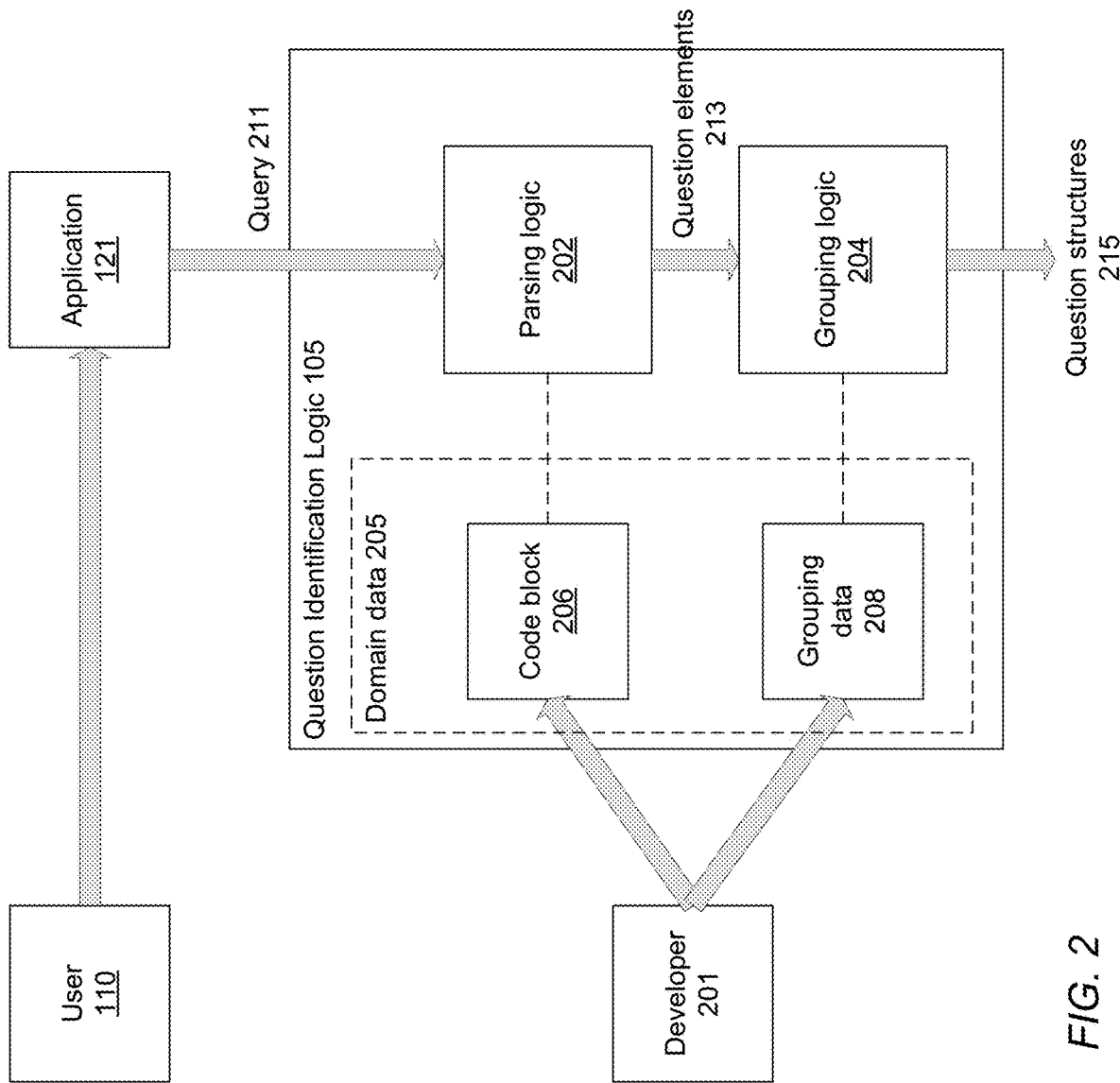
FIG. 2 is a data flow diagram illustrating the inputs to, and outputs from, the question identification logic when processing a natural language query, according to one embodiment.

FIG. 2 is a data flow diagram illustrating the inputs to, and outputs from, the question identification logic when processing a natural language query, according to one embodiment. Initially, a developer 201 provides a software application 121 via a developer host system 120. The developer's application 121 is configured to receive natural language queries 211 in one or more domains. Each domain represents different types of information, with different types of entities about which information can be sought and different types of characteristics for the different entities. In one embodiment, these different entities are expressly defined, with the types of entities about which information can be sought being referred to as "objects," and their different characteristics referred to as "attributes." The attributes may in turn have further restrictions or specified forms of expression (hereinafter referred to as "qualifiers" of the attributes). For example, referring again to the example natural language query "What is the area of Japan in square miles and square meters?", "Japan" is the object about which information is being sought, "area" is the attribute of the object, and "square miles" and "square meters" are two distinct qualifiers for the attribute "area," in that they represent two different (and mutually exclusive) ways of expressing that attribute.

The term "question element" is used hereinafter to refer to computer-coded data making up part of a question and being derived from a particular semantic component of the natural language query, the semantic component corresponding to a portion of the query and conveying a discrete meaning. In the example embodiment in which the components of a query include objects, attributes, and qualifiers, the question element is represented as a tuple including the general class of the component (e.g., object, attribute, or qualifier) and the value of that class (e.g., "Japan" for an object, "area" for an attribute, or "square meters" for a qualifier), possibly with additional information (e.g., the type of object, such as "Country", for which "Japan" is the value in the example above).

The question identification logic 105 implements core rules specifying how the different question elements are programmatically identified and then combined into distinct questions representing the underlying information requests implied by a natural language query. However, the question identification logic 105 does not encode actual knowledge of the details of every possible domain for which all the applications 121 might be configured to support natural language queries. Accordingly, for each domain for which a developer intends the application 121 to support queries, the developer 201 provides domain-specific knowledge information 205 to effectively parameterize the question identification logic 105 for a particular domain, enabling the question identification logic 105 to generate well-formed questions for the particular domain. Further specifics of the domain knowledge 205 are provided with respect to the semantic grammar 206 and grouping data 208 described below.

In one embodiment, the question identification logic 105 is configured to identify the distinct questions within a natural language query into two separate stages: a first stage that produces a sequence of question elements 213 corresponding to the natural language query, and a second stage that regroups the question elements into separate questions 215 that correspond to the distinct questions implied by the natural language query. Accordingly, in this embodiment the question identification logic includes parsing logic 202 that accomplishes the first stage, and grouping logic 204 that accomplishes the second stage. Similarly, the domain knowledge information 205 supplied by the developer includes data used to describe the semantic grammar 206 that is used by the parsing logic 202, and grouping data 208 that is used by the grouping logic 204.

The output of the question identification logic 105 is a set of questions 215. The application 121 can then easily process the questions 215 into structured queries, and execute the corresponding structured queries to obtain the information that the separate questions represent. (As one example, for a question data structure of the form <object, attribute, qualifier>, an application 121 configured to obtain information about a country could parse a received question data structure and issue a query of the form "SELECT attribute.value FROM PlaceTable WHERE Country=object.value".) The applications 121 can then provide the resulting information to the client device 110, either directly (e.g., showing the information in a query result area), or indirectly (e.g., by presenting a transformed version of the information).

Figure 3:
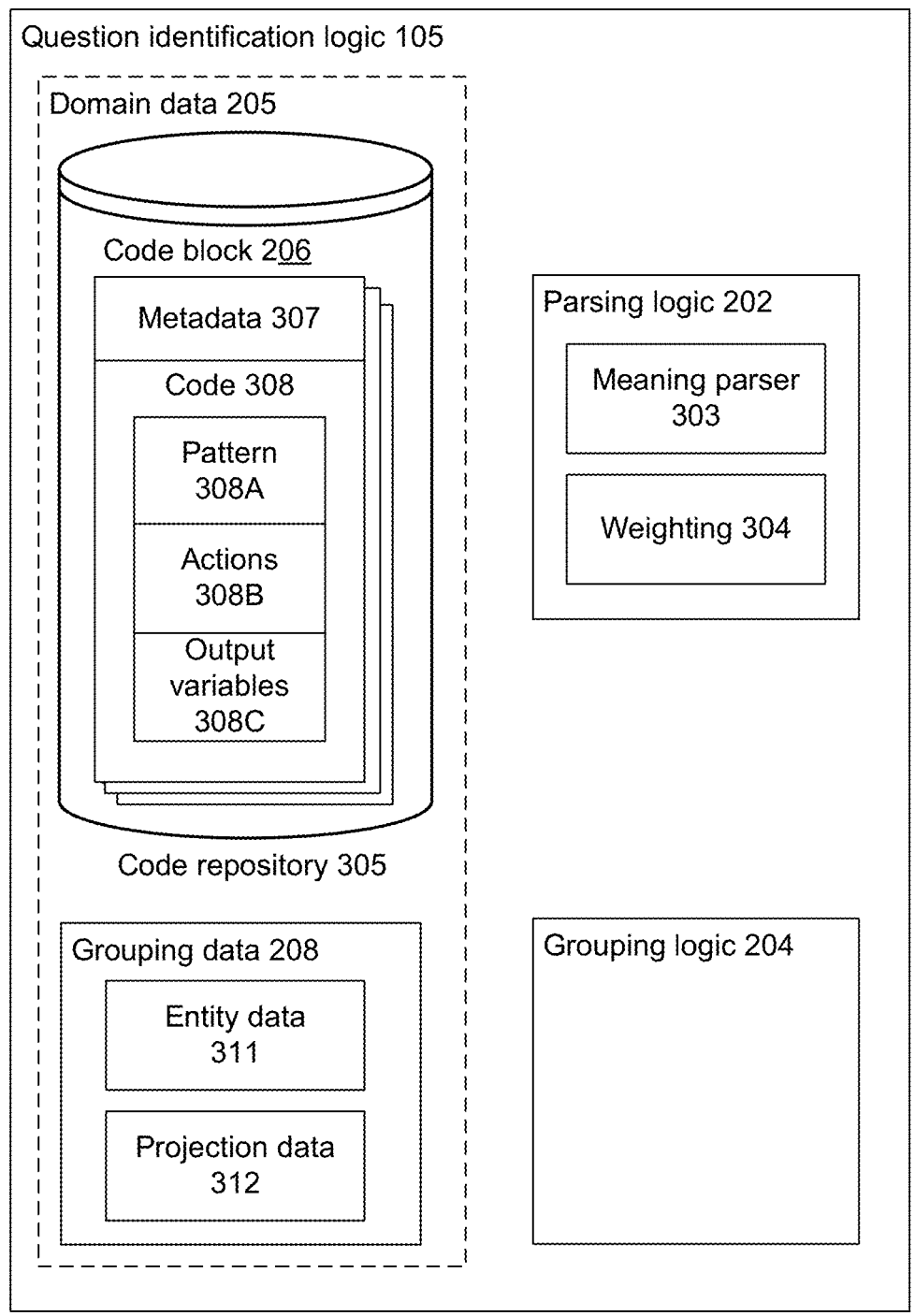
FIG. 3 illustrates in more detail the components of the question identification logic of FIG. 2, according to one embodiment.

FIG. 3 illustrates in more detail the components of the question identification logic 105 of FIG. 2, according to one embodiment. As can be appreciated by one of skill in the art, the configuration of the question identification logic 105 on the computer system in which it is embodied (e.g., the query-processing server 100) results in a particular, non-generic computer system that is specifically structured to perform the functions described herein.

The question identification logic 105 (or, e.g., the query-processing server 100 that in some embodiments implements it) includes a code repository 305 that has a set of semantic grammars 206. Each semantic grammar 206 programmatically defines a set of natural language expressions (hereinafter "expressions") that it is able to interpret, such as expressions describing a particular geographic fact, a desired movie, or the like. The semantic grammars 206 are typically submitted by the various developers 201 of the applications 121, although it is possible for the semantic grammars to be submitted by other parties as well, such as the entity responsible for the query-processing server 100.

A semantic grammar 206 in the code repository 305 has associated metadata 307, such as a name, a description, an author, and/or a date of submission. It also has one or more rules 308 defined in a programming language. Each semantic grammar rule 308 defines: a pattern 308A for the natural language expressions that the semantic grammar 206 can interpret (for example, a natural language expression that specifies a date or a range of dates); optionally empty programming actions 308B that may include semantic constraints, and output variables 308C that represent the meaning of the natural language expression, as discussed below.

A semantic grammar 206 is said to be able to interpret a natural language expression if the expression can be successfully parsed according to the pattern 308A of one of the rules 308 of the semantic grammar 206, and the semantic constraints (if any) defined by the corresponding actions 308B are all satisfied; the meaning representation of the expression is then defined by the output variables 308C of the rule 308. Examples of relevant natural language expressions include those that represent places (e.g., "South America"), attributes ("area"), units ("in square miles"), dates ("in 1991", or "during the nineties") and the like; the corresponding output variables (i.e., meaning representations) are internal system symbols or data structures that represent the place entity, the attribute, the unit, and the date or date range. All of these meaning representations qualify as a question element. Another example of a natural language expression is an entire query. Such an expression will include sub-expressions that convey questions elements, as just described.

If a natural language expression (or entire query) can be successfully interpreted by a given semantic grammar 206, the interpretation has an associated meaning defined by values of the output variables 308C, and (in embodiments that have a weighting module 304, as described below) an associated strength measure. If the natural language expression cannot be successfully interpreted by the semantic grammar, in one embodiment the interpretation returns a NULL value or other value signifying that the natural language expression could not be interpreted by the semantic grammar; in another embodiment, the failure of a semantic grammar to interpret an expression does not result in any return value, but instead in the failure of a search to complete.

An expression pattern 308A corresponds to one of the ways of describing the right-hand side of a context-free grammar rule, such as (BNF) Backus-Naur Form or EBNF (Extended Backus-Naur Form), or a regular expression, or a finite state automaton (FSA), or the like. The expression pattern 308A may be specified in terms of other semantic grammars, thereby allowing for hierarchical relationships between semantic grammars, and parsing of expressions.

The programming actions 308B may be used to assign values to the output variables 308C based on the natural language query that the semantic grammar 206 interprets.

In one embodiment, the programming language is a general purpose procedural programming language that is extended with additional programming constructs for specifying natural language interpretation, such as the patterns 308A of the expressions to be matched. In one embodiment, the semantic grammars 206 are defined by an extended procedural programming language based on C++ in which "interpret" blocks define the expression 308A to be matched, the semantic grammar parameter list defines the output variables 308C, and standard C++ statements define the programming actions 308B. It is appreciated that languages other than C++ could equally be used in other embodiments.

In one embodiment a semantic grammar 206 has the general schema "block outputVariablesList blockName (pattern programmingAction)+", where "outputVariablesList" is the output variables 308C, "blockName" is the given name of the block, "pattern" is the expression pattern 308A, and "programmingAction" is an action 308B. The expression (pattern programmingAction)+ indicates that there are one or more pairings of a pattern with a programming action. One simple, concrete example of the use of this extended procedural programming language follows in Listing 1, below:

Listing 1

```
extern block (int totalPoints) TENNIS_POINTS( ) {
    interpret {
        (["what is" | 10 "tell me"] . ["the"] . "number of
        points played when announcer says" .
        n1=VALID_TENNIS_NUMBER( ) . ["to"] .
        n2=VALID_TENNIS_NUMBER( ))
    } as {
        totalPoints = (Points(n1->count) + Points(n2->count));
    }
}
static block (int count) VALID_TENNIS_NUMBER( ) {
    interpret {
        n_love=LOVE( ) | n=INTEGER_COUNT( )
    } as {
        if (n_love) {count = 0;}
        else {
            if ( (n->count != 15) && (n->count != 30) && (n-
            >count != 40) ) {excludethis( );}
            else {count = n->count;}
        }
    }
}
static block ( ) LOVE( ) {
    interpret {
        "love"
    } as { }
}
int Points(int score) {
    switch (score) {
        case 0: return 0; break;
        case 15: return 1; break;
        case 30: return 2; break;
        case 40: return 3; break;
        default: return -1;
    }
}
```

In the above example, the semantic grammar 206 named TENNIS_POINTS( ) is able to interpret an expression embodying a request to determine how many points have been played in a game based on the game score in a tennis match, with the meaning of the expression represented by output variables 308C in the parameter list (namely, the integer "totalPoints"). The expression pattern 308A

(["what is"|10 "tell me"].["the"]."number of points played when announcer says".n1=VALID_TENNIS_NUMBER( ).["to"]. n2=VALID_TENNIS_NUMBER( ))

defines a set of possible expressions that a user may input (either in text or speech) to request the current number of points so far in a tennis game. The expressions optionally begin with either the phrase "what is" or "tell me", optionally followed by the word "the", followed by the phrase "number of points played when announcer says", followed by two numbers that are valid in tennis and that are optionally separated by the word "to". Note that by constructing a more flexible expression pattern 308A for expressions in the domain of interest—one that includes a greater range of alternative forms of expression—a developer can create a more "broad spectrum" query interpretation system for users.

The numbers that are valid in tennis are in turn represented by their own semantic grammars 206 named "VALID_TENNIS_NUMBER" and which accepts the scores 15, 30, 40, or "love". Thus, the expression pattern 308A of this example semantic grammar can interpret the expression "what is the score when announcer says fifteen love" (in which case its meaning is represented by the value 1 for the totalPoints output variable), but not "what is the score when announcer says fifteen eighty" because the former expression can be successfully parsed according to the expression pattern 308A, but the latter expression cannot (because "eighty" is not a valid tennis number).

Note that the semantic grammar INTEGER_COUNT( ) is not defined in Listing 1, but (for example) is provided by a separate developer and submitted to the code repository 305 for use by others, such as the author of the TENNIS_POINTS( ) semantic grammar of Listing 1.

Note also that the programming actions 308B may accomplish different types of purposes. For example, the programming actions 308B of the block TENNIS_POINTS( )(i.e., the code "totalPoints=(Points (n1→count)+Points (n2→count));") simply converts the given two scores to point values and sums them, whereas the programming actions 308B of the VALID_TENNIS_NUMBER( ) block (i.e. the code beginning with "if (n_love) {count=0;}") specifies the semantic constraint that the score be "15", "30", or "40"; if this semantic constraint is not satisfied, the excludethis( ) function will be called to abort the parse as unsuccessful.

The query-processing server 100 comprises parsing logic 202 that takes a natural language query as input and determines whether a given semantic grammar 206 can interpret that query and if so (optionally) a match strength measure between the given semantic grammar and the expression. A semantic grammar 206 is considered to be able to interpret natural language query if the query can be parsed according to the semantic grammar's pattern 308A and satisfies the semantic grammar's semantic constraints (if any).

The parsing logic 202 has a meaning parser module 303 that accepts textual input for a natural language query and determines whether a given semantic grammar 206 can interpret that textual input.

In one embodiment, the parsing logic 202 also has a weighting module 304 that assigns values to successful interpretations of an expression as a way to rank the relative strength of the successful interpretations. Specifically, the weighting module 304 computes a match strength measure corresponding to a measure of strength of a parse obtained by a semantic grammar 206 parsing the given query, such as the estimated likelihood that the parse produces the query.

The match strength measure is determined as a function of weights assigned to sub-expressions within the given expression that ultimately matches the input. In one embodiment, the weights of sub-expressions represent likelihoods of the sub-expressions, and the weight of the matching expression is calculated as the product of the weights of the sub-expressions. For instance, referring to the above code example of Listing 1, the expression pattern 308A for the TENNIS_POINTS semantic grammar is composed of sub-expressions such as "what is", "tell me", "the", "number of points when announcer says", VALID_TENNIS_NUMBER( ) (a separate semantic grammar), and "to". In the disjunction for the optional sub-expression ["what is"|10 "tell me"], the value 10 serves as a weight corresponding to the sub-expression "tell me". This causes the weighting module 304 to assign a likelihood value of 1/(1+10)=1/11 to the alternative "what is", and 10/(1+10)=10/11 to the alternative "tell me", reflecting an expectation that a user will be 10 times as likely to say "tell me" as the user would be to say "what is" when expressing a request for a tennis score. Accordingly, expressions that are interpreted by the TENNIS_POINTS( ) semantic grammar 206 and that begin with "tell me" will obtain higher match strength (0.9090) measures than those that match but begin with "what is" (0.0909).

The grouping data 208 for a particular domain includes entity data 311 and projection data 312. The entity data 311 specifies the types of "entities" that exist within the domain. The entities for a given domain correspond to the possible question elements that natural language queries from that domain can have. As one simplified example, the entity data 311 for a particular entertainment domain might specify that the domain includes objects of type "movie" and "actor", attributes "name", "length", "starring", "released in", and "genre", and qualifiers "minutes", "hours", and "time range". Thus, natural language queries in this domain could include the query "What western movies were released in 1996?", where "movie" is a supported object, "western" is a supported qualifier of the "movie" object, "released in" is a supported attribute, and "time range" (1996) is a qualifier of the "released in" attribute. As another simplified example, the entity data 311 for a particular domain of places might specify that the domain includes objects of type "country", "state", or "city", the attributes "capital", "population" and "area", and the qualifiers "in millions", "in thousands", "time range", "square miles", and "square meters".

The projection data 312 determines which combinations of the various possible question elements can be meaningfully combined into ("projected onto") a single question, according to the ontology and semantics of the domain in question. The projection data 312 could be implemented as (for example) procedural code for a function accepting a pair of question element entities and, based on the classes of the entities, returning a Boolean value indicating whether one can be projected onto the other. The projection data 312 could also be represented as non-procedural data, e.g., as a table of pair of question element entities, and a corresponding Boolean value for each pair, the table being read and implemented by separate code within the grouping logic 204. For example, the projection data 312 might specify that a question element entity representing an attribute for a movie genre can be projected onto a question element entity representing a movie object, since a movie can be said to have a genre, but that a genre entity cannot be projected onto a release date entity, since a release date does not have a genre.

The definition of projectability begins with pairs of question elements (this is part of the projection data 312) and can be extended to a definition of projectability involving questions. A question element is projectable onto another question element if the projection data 312 so specifies. In turn, a question element is said to be projectable onto a question if it is projectable onto all the elements of the question. Further, a second question is projectable onto a first question if all the elements of the second question are projectable onto the first question, per the previous definition. If a question element is projectable onto a question, the element is projected onto the question by adding the question element to the question, typically by appending it at the end of a sequence of question elements that represents the question.

The projection relationships may be defined by the projection data 312 for any or all of the different classes of entities, such as (in one embodiment) objects, attributes, or qualifiers. Examples of some of the different possible relationships are now provided.

Object-to-Attribute: Defines which types of objects can have which types of attributes. For example, although "movie" and "actor" are both possible entities, and "genre" is a possible attribute, of the example entertainment domain described above, a movie may validly be said to have a genre, but an actor may not. Thus, "movie"-"genre" is a valid pairing, but "actor"-"genre" is not.

Attribute-to-Qualifier: Defines which types of attributes can have which types of qualifiers. For example, in the domain of places described above, "area"-"square miles" is a valid pairing because area can be expressed in square miles, but "population"-"square miles" is not a valid pairing because population cannot be expressed in square miles.

Qualifier-to-Qualifier: Defines which types of qualifiers can coexist within a single question. Different qualifiers are considered projectable into the same question if they apply to different attributes. For example, for the query elements of the general format [object, type="movie"], [attribute, type="released"], [qualifier, type="time range"], [attribute, type="starring"], [qualifier, type="actor"], the "time range" and "actor" qualifiers are inherently projectable into the same query, since they qualify different attributes (namely, "released" and "starring"). In the case of qualifiers for the same attribute, the projection data 312 for the given domain can be used to specify the valid pairings based on whether the qualifiers are mutually exclusive. For example, for the query elements [object, type="movie"], [attribute, type="starring"], [qualifier, type="actor"], [attribute, type="starring"], [qualifier, type="actor"], the projection data 312 could specify that the qualifier pairing "actor"-"actor" is valid, since it is meaningful to specify two different actors as part of requesting movies that had certain stars (i.e., movie starring both of the given actors). In some embodiments that take into account logical operators such as negation, qualifiers that are mutually exclusive are permitted if one qualifiers is negated and the other is not—e.g., although the "time range" qualifier of the "released in" attribute is mutually exclusive with respect to itself (in that something can't be released at multiple times), it is meaningful to specify both "not <time range 1>" and "not <time range 2>" within the same question.

Object-to-Object: In one embodiment, a single question refers only to one object, and hence an object may not be projected onto a question that already contains another object. For example, for the query elements [object, type="Country", value="China"], [attribute, type="population"], [object, type="Country", value="Japan"], [attribute, type="area"], the entities "China" and "Japan" cannot be projected onto the same question, but rather constitute two distinct questions.

Example Embodiment of Grouping Data 208

The semantic grammars 206 and grouping data 208 may be specified in different manners in different embodiments. For example, in one embodiment noted earlier, the semantic grammars 206 may be implemented in a special-purpose language, such as the extended procedural programming language discussed above with respect to Listing 1. More broadly, the pattern 308A for a top-level semantic grammar 206 for a particular domain represents the grammatical structure of natural language queries in the domain. The action 308B for the semantic grammar 206 produces a sequence of question elements, such as <[attribute, type="area"], [object, type="Country", value="Japan"], [qualifier, type="unit", value="square miles"], [qualifier, type="unit", value="square meters"]> for the natural language query "What is the area of Japan in square miles and square meters?" In one embodiment, the semantic grammar 206 produces question elements in the same order as they were found in the original natural language query, as in the directly preceding example; in other embodiments, the semantic grammar 206 may alter the order to simplify the processing later performed by the grouping logic 204.

In one embodiment, the grouping data 208 is also specified using code in a procedural programming language. For example, the entity data 311 may be specified using an enumeration type, such as the "enum" of C or C++. For instance, the following C++ enum could specify the various attributes that a "Movie" object could have within the "Entertainment" domain:

```
enum EntmtMovieAttribute
{
  ENT_PROGRAM_ATTR_NONE=0;
  ENT_PROGRAM_ATTR_STARRING_ACTOR,
  ENT_PROGRAM_ATTR_RELEASE_DATE,
  ENT_PROGRAM_ATTR_GENRE,
  . . .
};
```

More generally, the entity data 311 may be represented with any data that can represent a set of distinct items.

The projection data 312 may likewise be represented, in all or in part, by written in a procedural programming language. As one example, the projection data 312 may be represented using a C/C++ function that takes a pair of entities as arguments and returns a Boolean value representing whether those entities may be projected onto the same question. Internally, the function may use static relationship data defined by the code, such as illustrated in the following can_project_to( ) function, which specifies that the "starring actor" attribute is projectable onto itself (i.e., it's possible to have multiple starring actors), and the "movie" object attribute is projectable onto the "starring actor" attribute (i.e., "starring actor" is a valid attribute of a movie), and (implicitly) that any non-listed relationship is not projectable.

```
bool can_project_to(Entity e1, Entity e2) {
  if ((e1.type==ENT_PROGRAM_STARRING_ACTOR)
  && (e2.type==ENT_PROGRAM_STARRING_ACTOR))
  return true;
    if   ((e1.type==ENT_PROGRAM_MOVIE)   &&
  (e2.type==ENT_PROGRAM_STARRING_ACTOR))
  return true;
  . . .
  else return false;
}
```

More generally, the projection data 312 may be represented with any data that can represent relationship pairs and whether those pairs are valid or invalid.

In some embodiments, the functionality of the grouping data 208 can alternatively be accomplished using the semantic grammars 206 (and vice-versa). For example, the patterns 308A of the semantic grammar 206 for a domain could enforce that only a certain set of attributes (or qualifiers) are valid for a certain type of object. The grouping logic 204 (implemented by grouping code) regroups a sequence of question elements from a domain into a set of separate questions, using the domain-specific grouping data 208. In one embodiment, the grouping logic 204 produces questions 215 of the form <object, [attribute], qualifier*>, i.e., a tuple where an object is followed by an optional attribute and by zero or more qualifiers for the attribute or the object. For example, the question "What is the area of Japan in square miles?" is implied by the natural language query "What is the area of Japan in square miles and square meters?" and it might be represented by the query structure <[class=object, type="Country", value="Japan"], [class=attribute, type="area"], [class=qualifier, type="unit", value="square miles"]>. It is appreciated that many other data structures for expressing the same underlying data are also possible. For example, the question element for "Japan" could be represented with a programming object (instance of a programming class) corresponding to a Country type, with internal data members indicating that its value is "Japan."

The grouping logic 204 applies the projection data 312 to determine how to group a sequence of question elements into a set of questions. Note that although the grouping data 208 is domain-specific, in that its data (e.g., the entity data 311 and projection data 312) are tied to the domain in question, the grouping logic 204 itself is domain-independent, in that its grouping techniques do not depend directly on the domain in question, but rather apply to all domains.

The grouping logic 204 may use different approaches in different embodiments to accomplish the grouping.

A first example embodiment of the grouping logic 204—referred to as "GL1"—is now described. In GL1, the grouping logic 204 starts by turning the first question element into a one-element question. It then proceeds in an iterative manner over the rest of the elements, determining for each question element not yet processed whether it can be projected onto each of the pre-existing questions. Where the current (not-yet-processed) question element is projectable onto another question element, the two are grouped into a single question; where the current question element is projectable onto an existing question (i.e., is projectable onto every question element of that question), it is added to that question; where the current question element is not projectable onto every question element of an existing question, that existing question is copied into a new question containing the question elements of the existing question onto which the current question element is projectable, and the current question element is added into it.

For purposes of explanation, a shorthand notation involving symbols made of a letter and a number, such as "a1", "a2" and "c2", is used below to describe the behavior of GL1 on examples. Symbols that use the same letter represent question elements from the same entity class, such as two countries (e.g., Japan and China), or two geographical attributes (e.g., Area and Population). Further, for each letter (class and type) different numbers will be assigned to different question elements that are members of the class. For example, if letter "a" refers to the object type "Country", then "Japan" and "China" may be written using shorthand symbols "a1" and "a2", for example. The following general rule models projectability in terms of this shorthand notation: two symbols using the same letter but different numbers cannot be projected onto each other; whereas identical symbols, and symbols with different letters can be projected onto each other and hence combined into the same question. It is appreciated that this notation is convenient for purposes of explanation but that it comes with limitations not inherent in actual embodiments. Thus, in this disclosure, although examples showing the grouping logic in action are provided in terms of the explanatory shorthand notation, shorthand notation does not capture the full complexity of which the grouping logic 204 is capable when used in conjunction with grouping data 208.

As a first example (given in the shorthand notation), the sequence $a_1$ $b_1$ $b_2$ of question elements can be evaluated as follows by the GL1 grouping logic as follows:

$a_1$ $b_1$ $b_2$ ($a_1$, $b_1$) $b_2$ [To begin, $a_1$ and $b_1$ are compared, and are projectable onto each other, so are combined into the single question ($a_1$, $b_1$); in the meantime, element $b_2$ is not yet processed.]

($a_1$, $b_1$), ($a_1$, $b_2$) [The current element, $b_2$, is not projectable onto the question $b_1$) because it is not projectable onto b1, which is already within the question, so a second question is formed containing $a_1$ (onto which $b_2$ can projected), and then $b_2$ is combined into that second question, producing the second distinct question ($a_1$, $b_2$), in addition to ($a_1$, $b_1$).]

Another embodiment of the grouping logic 204 is referred to herein as ADAPT (an acronym for Attribute Dimensional Argument Projection Transformation). A textual explanation of ADAPT is given below. A more precise and definitive specification of the logic is found in Appendices 1 and 2, which provide a self-contained full description of one example embodiment. Appendix 1 describes the main function. Appendix 2 describes auxiliary definitions for basic classes that represent (1) question elements (e.g., $a_1$); (2) lists of question elements (this includes the case of questions, which are lists of question elements where all pairs are mutually projectable; e.g., ($a_1$, $b_1$)); and (3) lists of lists of question elements (including lists or sets of questions; e.g., ($a_1$, $b_1$) $b_2$, or ($a_1$, $b_1$) ($a_1$, $b_2$)). Appendices 1 and 2 together provide a complete description of this example embodiment of ADAPT aimed at processing the text of the shorthand notation.

The ADAPT technique shares numerous similarities with GL1. It processes question elements sequentially and constructs a set of questions, where each question grows independently in response to successive inputs from the given question element sequence. When the current question element can project onto the existing set of questions, the set of questions will grow "horizontally"; that is, the total number of questions does not change, but some or all of the questions in the set will grow longer by appending the current question element to their end. When the current question element cannot project onto any existing question, the set of questions will grow "vertically" through the addition of new questions to the set. New questions will always start as singleton questions that only contain the current question element. As a result, the first sequence of question elements that are all mutually exclusive (non-projectable to each other) will be mapped to singleton questions, and this forms the initial set of "questions" that will grow as each successive question element is processed.

In the embodiment of the ADAPT grouping logic in Appendix 1, the outer loop (marked #INNER LOOP in the code) performs what appears to be a simple left-to-right scan of the input elements, mimicking the behavior of GL1. However, ADAPT also differs from GL1 in a number of respects. In ADAPT, the outer loop is used to process any remaining question elements, after a question element has been encountered, that cannot project to any existing question. But there is an inner loop (marked #INNER LOOP in the code) that actually processes successive question elements, inside the outer loop. The purpose of the inner loop is to find the longest consecutive sequence of question elements where each question element can project to at least one of the existing questions. When such a sequence has been found and its length is more than one, the outer loop will advance to the end of that sequence, which jumps over some question elements; but these elements had already been scanned in the inner loop.

The logic uses a variable named questions to represent the current set of questions, referred to herein as "the existing questions" or "the current questions;" this variable is initialized to a singleton set, where the single initial question is an empty list of question elements. For each existing question, the list of question elements that can project to it will be formed; these lists are stored as "projecting question element lists". The inner loop uses the projection data 312 to test if the current question element can project to an existing question. The logic also considers the relative positioning of question elements to determine if a question element is allowed to project to an existing question. The basic test would only involve the projectability of the new element onto an existing question; but the processing of some queries benefits from additional tests, marked ADDITIONAL TESTS in the code. Consider the query "China population and area Japan", which would be interpreted as three questions by the basic logic (without the additional tests): "China population,", "China area," and "Japan." This interpretation is not the desired one. With additional tests, the logic can identify instead the two questions, "China's population" and "Japan's area," which are a better fit to user expectations. In general, some composite queries that have attributes placed in between multiple projectable objects, result in a possible ambiguity as to which element to project to, and this ambiguity is resolved by expressing a preference criterion in the code. In the above example, it is best to project the "population" attribute backward (to the left) onto the "China" object, and the "area" attribute forward (to the right) onto the "Japan" object. In ambiguous situations, additional tests can generally express a preference that resolves the ambiguity. In this case, the preference criterion helps ensure that each question has at least two question elements (presumably one attribute and object) and avoid generating singleton questions (e.g., with only an object).

Another major difference between ADAPT and GL1 is the use of recursion. After building the projecting question element lists, ADAPT will project each projecting question element list onto its corresponding question. Before projecting onto each question, the ADAPT logic is applied recursively to each projecting question element list. Note well that this is not tail recursion; a separate recursive call is applied in parallel to every projecting question element list.

The recursive application of the logic to each projecting list is used because, even though each question element individually projects to at least one existing question, the question elements in each projecting question element list may not all be mutually projectable. Each recursive call to ADAPT will return a set of "partial questions" that only contain question elements from the projecting question element list. For each partial question, a copy is made of the question corresponding to the projecting question element list. The partial question is then projected to the copied question whenever allowed by the projection rules, and this is how each question can grow horizontally. This new (horizontally extended) question is added to a list of "new questions", and all projections have been completed, the previous existing question set is replaced by the new extended questions. Where instead the recursive call to ADAPT does not yield any partial questions, no projection is performed and the old question is added to the new questions unchanged.

As an explanation of the reason for, and operation of, recursion within ADAPT, consider the following simple example of the query "China's area, population and capital." For this query, the set of questions is initialized as a singleton set containing one question composed of the question element "China". The longest consecutive sequence of question elements where each question element can project to at least one of the existing questions is now ("area", "population", "capital"). These projecting question elements are not mutually projectable, even though each question element can project to at least one of the existing questions. A recursive call is then needed to split the projecting question elements into valid questions. For the above example, the set of questions returned by the recursive call is (("area"), ("population"), ("capital")), according to the logic described in the previous paragraph. These returned questions are then individually projected onto ("China"), creating the desired result (("China", "area"), ("China", "population"), ("China", "capital")). This example shows the value of recursion to the ADAPT logic, whenever alternative question elements, such as ("area", "population", "capital"), appear to the right of a question that they project to, such as ("China") here.

Appendix 3 shows the results of applying ADAPT to a collection of test patterns.

In one embodiment, the semantic grammars 206 and the grouping logic 204 for a given domain are both implemented within the same set of files of code. For example, the semantic grammars 206 may include calls to the grouping logic 204 corresponding to locations in the patterns 308A indicating that an entire natural language query has been parsed, and thus the resulting question elements are ready to be grouped into questions.

Example Interaction Sequence

Figure 4:
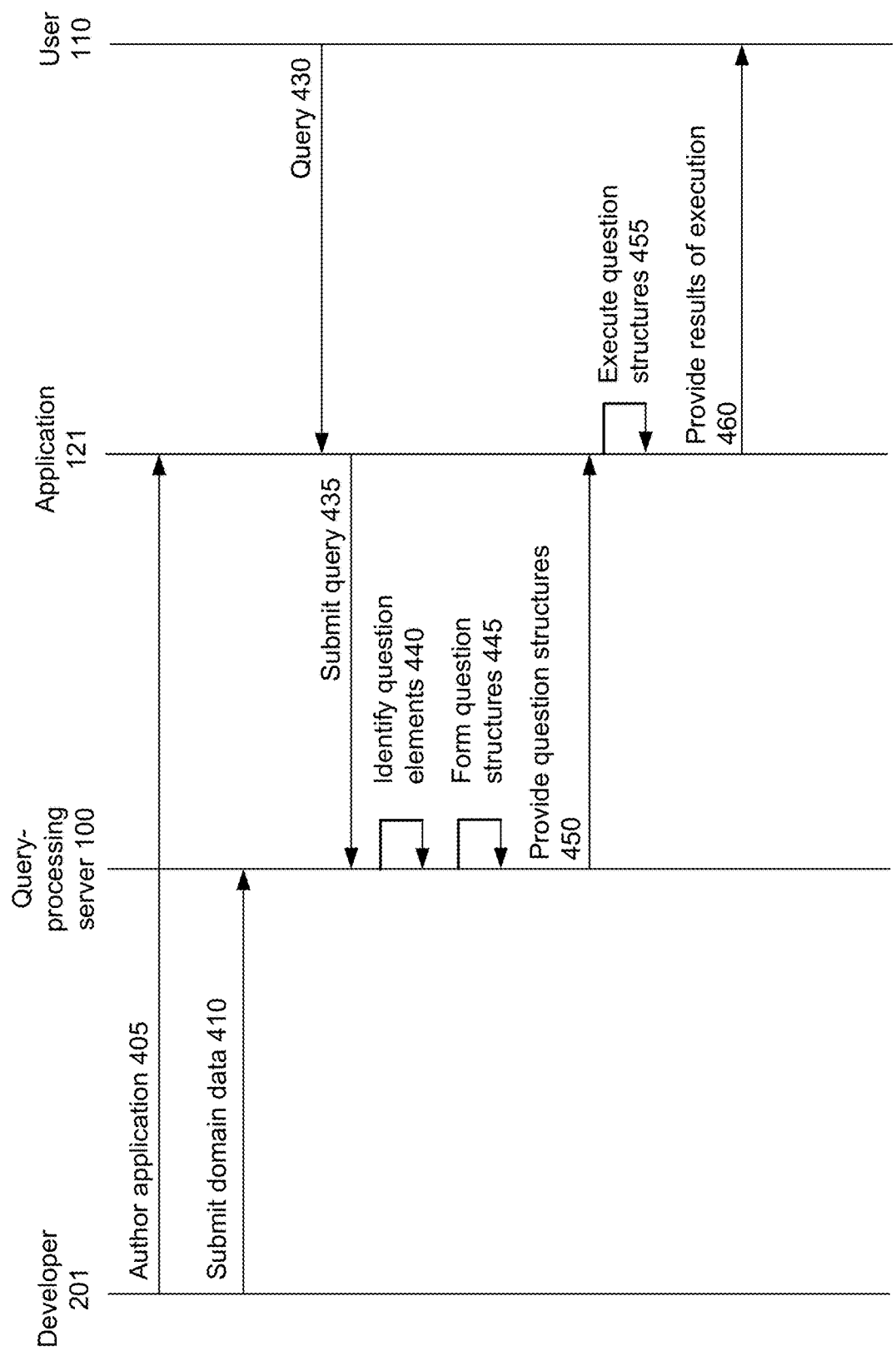
FIG. 4 is a sequence diagram illustrating interactions between the different entities of FIGS. 1 and 2, according to one embodiment.

FIG. 4 is a sequence diagram illustrating interactions between the different entities of FIGS. 1 and 2, according to one embodiment.

An application developer 201 provides 405 an application 121 and sets it up on a developer host system 120 for execution. The application developer 201 also submits 410, and the query-processing server receives, domain knowledge information 205 describing a domain for which the developer desires that the application 121 be able to handle natural language queries, the domain knowledge including a semantic grammar 206 and grouping data 208.

At some later point, a user submits 430 a natural language query (e.g., "What is the area of Japan in square miles and square meters?") to the application 121, and the application makes a call 122 to submit 435 the query to the query-processing server 100. The question identification logic 105 of the query processing server 100 (e.g., the parsing logic 202) then uses the received semantic grammar 206 to identify 440 an ordered sequence of question elements within the query, such as <[class=attribute, type="area"], [class=object, type="Country", value="Japan"], [class=qualifier, type="unit", value="square miles"],

[class=qualifier, type="unit", value="square meters"]>, where the attributes, objects, and qualifiers represent the semantic components of the query.

The question identification logic 105 (e.g., the grouping logic 204) uses the grouping data 208 to transform the ordered sequence of question elements, forming 445 a set of questions representing the distinct questions implied by the natural language query. Continuing the example above, the questions could be (1) <[class=object, type="Country", value="Japan"], [class=attribute, type="area"], [class=qualifier, type="unit", value="square miles"]> and (2) <[class=object, type="Country", value="Japan"], [class=attribute, type="area"], [class=qualifier, type="unit", value="square meters"]>, representing the two distinct questions "What is the area of Japan in square miles?" and "What is the area of Japan in square miles?" The question identification logic 105 provides 450 the questions to the application 121 that submitted 435 the natural language query.

Because of the simple and regular structure of the questions, the application 121 can easily interpret the meaning of the questions and execute 455 them. For example, the application can map the question to a structured query or other encoding, such as the SQL query "SELECT AreaMeters FROM PlaceTable WHERE Country="Japan"" followed by a function call mapping square meters to square miles (for the example where the specified qualifier is "square miles"). The application 121 can then provide 460 the results (e.g., "145,925 square miles", or "The area of Japan in square miles is: 145,925 square miles") to the user who submitted the natural query.

Example Computer Architecture

Figure 5:
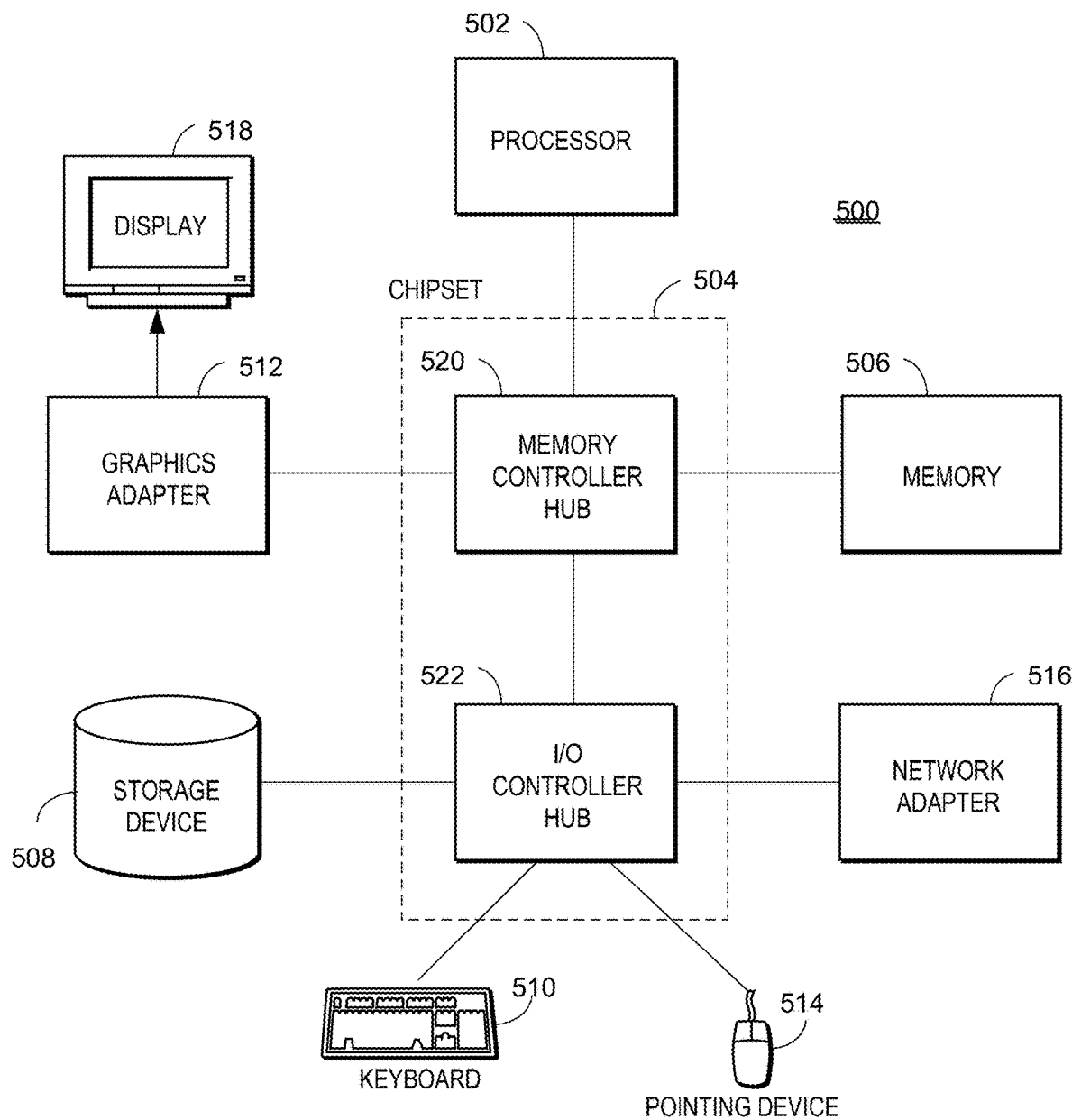
FIG. 5 is a high-level block diagram illustrating physical components of a computer used as part or all of the query-processing server or host or user systems of FIG. 1, according to one embodiment.

FIG. 5 is a high-level block diagram illustrating physical components of a computer 500 used as part or all of the query-processing server 100 or client device 110, or developer host 120 from FIG. 1, according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

OTHER CONSIDERATIONS

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims below.

What is claimed is:

1. A computer-implemented method comprising:
   storing a semantic grammar for a domain, the semantic grammar identifying question elements within valid queries;
   storing grouping data for the domain, the grouping data describing what types of question elements are projectable onto each other, wherein projectable question elements may be grouped together within a question comprising a set of question elements;
   receiving, from an application, a natural language query;
   transforming, using the semantic grammar, the natural language query to an ordered sequence of question elements;
   using the grouping data to transform the ordered sequence of question elements to a plurality of distinct questions;
   maintaining a set of existing questions for the natural language query including at least a first existing question comprising a first set of question elements, each existing question comprising a subset of question elements of the sequence of question elements;

processing question elements of the sequence of question elements in sequence order, by:
  responsive to a current question element of the sequence of question elements being projectable onto all question elements of the first existing question, extending the first existing question by adding the current question element to the first set of question elements;
  responsive to the current question element not being projectable onto a question element of the first existing question, adding a new question to the set of existing questions, the new question comprising a second set of question elements derived from a copy of the first set of question elements by:
    removing, from the second set of question elements, any question element that is not projectable onto the current question element; and
    adding the current question element to the second set of question elements.

2. The computer-implemented method of claim 1, wherein the question elements are tuples with elements comprising: a class of the question element, and a value corresponding to the class.

3. The computer-implemented method of claim 2, wherein the class is one from the group consisting of: an object, an attribute of the object, and a qualifier of the attribute.

4. The computer-implemented method of claim 1, wherein the questions specify: an object to which the natural language query applies, an attribute of the object, and one or more qualifiers of the attribute.

5. The computer-implemented method of claim 1, wherein the grouping data is domain-specific, and transforming the ordered sequence of question elements to the plurality of questions is accomplished with grouping logic that is domain-independent.

6. A non-transitory computer-readable storage medium comprising:
  a code repository storing, in association with an application:
    a semantic grammar for a domain, the semantic grammar identifying question elements within valid queries, and
    grouping data for the domain, the grouping data describing what types of question elements are projectable onto each other, wherein projectable question elements may be grouped together within a question comprising a set of question elements; and
  instructions executable by a computer processor, the instructions comprising:
    instructions for receiving from the application a natural language query;
    instructions for transforming, using the semantic grammar, the natural language query to an ordered sequence of question elements;
    instructions for using the grouping data to transform the ordered sequence of question elements to a plurality of distinct questions;
    instructions for maintaining a set of existing questions for the natural language query including at least a first existing question comprising a first set of question elements, each existing question comprising a subset of question elements of the sequence of question elements;
    instructions for processing question elements of the sequence of question elements in sequence order, by:
      responsive to a current question element of the sequence of question elements being projectable onto all question elements of the first existing question, extending the first existing question by adding the current question element to the first set of question elements;
      responsive to the current question element not being projectable onto a question element of the first existing question, adding a new question to the set of existing questions, the new question comprising a second set of question elements derived from a copy of the first set of question elements by:
        removing, from the second set of question elements, any question element that is not projectable onto the current question element; and
        adding the current question element to the second set of question elements.

7. The non-transitory computer-readable storage medium of claim 6, wherein the question elements are tuples with elements comprising: a class of the question element, and a value corresponding to the class.

8. The non-transitory computer-readable storage medium of claim 7, wherein the class is one from the group consisting of: an object, an attribute of the object, and a qualifier of the attribute.

9. The non-transitory computer-readable storage medium of claim 6, wherein the questions specify: an object to which the natural language query applies, an attribute of the object, and one or more qualifiers of the attribute.

10. The non-transitory computer-readable storage medium of claim 6, wherein the grouping data is domain-specific, and transforming the ordered sequence of question elements to the plurality of questions is accomplished with grouping logic that is domain-independent.

11. A computer system comprising:
  a computer processor; and
  a non-transitory computer-readable storage medium storing:
    a code repository storing, in association with an application:
      a semantic grammar for a domain, the semantic grammar and identifying question elements within valid queries, and
      grouping data for the domain, the grouping data describing what types of question elements are projectable onto each other, wherein projectable question elements may be grouped together within a question comprising a set of question elements; and
  instructions executable by the computer processor, the instructions comprising:
    instructions for receiving from the application a natural language query;
    instructions for transforming, using the semantic grammar, the natural language query to an ordered sequence of question elements;
    instructions for using the grouping data to transform the ordered sequence of question elements to a plurality of distinct questions;
    instructions for maintaining a set of existing questions for the natural language query including at least a first existing question comprising a first set of question elements, each existing question comprising a subset of question elements of the sequence of question elements;
    instructions for processing question elements of the sequence of question elements in sequence order, by:

responsive to a current question element of the sequence of question elements being projectable onto all question elements of the first existing question, extending the first existing question by adding the current question element to the first set of question elements;

responsive to the current question element not being projectable onto a question element of the first existing question, adding a new question to the set of existing questions, the new question comprising a second set of question elements derived from a copy of the first set of question elements by:
- removing, from the second set of question elements, any question element that is not projectable onto the current question element; and
- adding the current question element to the second set of question elements.

12. The computer system of claim 11, wherein the question elements are tuples with elements comprising: a class of the question element, and a value corresponding to the class.

13. The computer system of claim 12, wherein the class is one from the group consisting of: an object, an attribute of the object, and a qualifier of the attribute.

14. The computer system of claim 11, wherein the questions specify: an object to which the natural language query applies, an attribute of the object, and one or more qualifiers of the attribute.

* * * * *